(12) United States Patent
Motoyama et al.

(10) Patent No.: US 7,387,804 B2
(45) Date of Patent: Jun. 17, 2008

(54) DARK OPAL BASIL LEAVES OR EXTRACT THEREOF HAVING IMPROVED STORABILITY

(75) Inventors: Jun Motoyama, Hatsukaichi (JP); Kenji Baba, Hiroshima (JP)

(73) Assignee: Mishima Foods Co., Ltd., Hiroshima-shi (JP)

( * ) Notice: Subject to any disclaimer, the term of this patent is extended or adjusted under 35 U.S.C. 154(b) by 0 days.

(21) Appl. No.: 10/449,773

(22) Filed: Jun. 2, 2003

(65) Prior Publication Data

US 2003/0228385 A1 Dec. 11, 2003

Related U.S. Application Data

(60) Provisional application No. 60/445,242, filed on Feb. 6, 2003.

(30) Foreign Application Priority Data

Jun. 3, 2002 (JP) ............................. 2002-161156

(51) Int. Cl.
*A61K 33/00* (2006.01)
(52) U.S. Cl. ...................... 424/745; 424/774
(58) Field of Classification Search ................ 424/745, 424/774; 426/615, 638, 321
See application file for complete search history.

(56) References Cited

U.S. PATENT DOCUMENTS 2,698,809 A * 1/1955 Fessenden
5,702,750 A * 12/1997 Darbonne
5,858,446 A * 1/1999 Lewis et al. ................ 426/615

OTHER PUBLICATIONS

Goto, T et al. Agric. Biol. Chem., 40(8): 1593-1596, (1976). Stabilization effect of neutral salts on anthocyanins: Flavylium salts, anhydrobases and genuine anthocyanins.*
Goto, T et al. Agric. Biol. Chem. , 40(8): 1593-1596, (1976). Stabilization effect of neutral salts on anthocyanins: Flavylium salts, anhydrobases and genuine anthocyanins.*
Phippen, W. B. et al., Journal of Heredity, 91(4): 289-296, (2000). Anthocyanin inheritance and instability in purple basil (Ocimum basilicum L.).*
D1: The Encyclopedia Cooking and Food, published Jan. 20, 1998, 2nd Ed., p. 368. (Partial Translation).
D2: Herb Cooking, published May 10, 1997, 2nd Ed., p. 81, lower part column. (Partial Translation).
W. B. Phippen, et al., Journal of Agricultural and Food Chemistry, vol. 46, No. 5, XP-000751949, PP. 1734-1738, "Anthocyanins in Basil (*Ocimum basilicum L.*)", May 1, 1998.
F. Misao, XP-002250849, pp. 340-341, "Okazuno Kisoto Kotsu Hyakka", 1982.
K. Yoshida, et al., Seventh Symposium on Salt, vol. II, XP-009015528, pp. 623-630, "Stabilization and Color Variation of Anthocyanins With Inorganic Salts", 1993.

* cited by examiner

*Primary Examiner*—Michele Flood
(74) *Attorney, Agent, or Firm*—Oblon, Spivak, McClelland, Maier & Neustadt, P.C.

(57) ABSTRACT

The present invention provides dark opal basil leaves or an extract thereof, containing anthocyanin dye derived from the dark opal basil, in concentrated form.

The process of the present invention comprises steps of (1) adding salt to dark opal basil leaves, (2) dehydrating the dark opal basil leaves obtained in step (1), and (3) immersing the dark opal basil leaves obtained in step (2) in an organic acid solution. In step (2), the dark opal basil leaves to be dehydrated are physically treated to such an extent that the cells thereof are broken or not broken.

11 Claims, No Drawings

DARK OPAL BASIL LEAVES OR EXTRACT THEREOF HAVING IMPROVED STORABILITY

TECHNICAL FIELD OF THE INVENTION

The present invention relates to a method for producing dark opal basil leaves or an extract wherein anthocyanin dye derived from dark opal basil leaves is contained in concentrated form thereof.

BACKGROUND OF THE INVENTION

There are various kinds of basils, and their flavors and colors are also various. As herbs have become popular in Japan, the cultivation of basils, having green color in general, such as sweet basil in vegetable gardens has recently become popular.

Because anthocyanin dye contained in dark opal basil leaves easily decolors under alkaline and neutral conditions, fresh or freshly-picked leaves of the dark opal basil are preserved by immersing them in acetic acid. When a large amount of fresh dark opal basil leaves are to be preserved in the form immersed in acetic acid for a long time, a part of the leaves is occasionally brought into contact with air and such leaves become moldy. Therefore, only a small amount of the dark opal basil leaves was immersed in a vinegar. For example, conventionally, several sheets of the dark opal basil leaves were used in the form immersed in a vinegar in a bottle or, when a large amount of the leaves are immersed in the vinegar, the leaves must be taken out of the vinegar after the storage of the immersed leaves for a given period of time but before the molds are formed.

Under these circumstances, dark opal basil leaves are used only for producing the extract thereof because the amount of the leaves which can be immersed in vinegar is only small. In such a case, the dye of the leaves is extracted in acetic acid used in a relatively large amount and, as a result, the leaves have a reduced dye content. As a result, the dark opal basil leaves immersed in a small amount of vinegar cannot be considered to be sufficient for the dressing for meats and vegetables.

On the other hand, when the leaves are used in a large amount, the immersion thereof must be finished in a short period of time before the molding. In such a case, the extract having a high dye concentration cannot be easily obtained because the extraction of the dye from the dark opal basil leaves is only weak.

SUMMARY OF THE INVENTION

Therefore, an object of the present invention is to provide a dark opal basil extract having a high dye concentration and storable for a long period of time.

Another object of the present invention is to provide dark opal basil leaves having an increased dark opal basil dye concentration.

After intensive investigations made for the purpose of attaining the object, the inventors have found the following facts: When a large amount of the dark opal basil leaves is treated with salt, the leaves can remarkably be reduced in volume because of the effects of the osmotic pressure and dehydration. Thus, even when the leaves are used in a large amount after the treatment, the leaves are not bulky and they can be immersed in an acid such as acetic acid. The dye is concentrated in the cells of the leaves by the dehydration. The dye thus concentrated in the cells has an increased hydrophobicity and, therefore, the dye in the leaves can be kept in a high concentration. Further, also when the leaves are crumpled or kneaded, or physically treated so that the cells of the leaves are broken, the dye is concentrated and diffused from the broken cells into the acid solution to form the extract having a high concentration. In addition, by controlling the degree of the breakage of the cells after the dehydration, the concentration of the dye in not only the leaves but also in the extract can be controlled as desired. The present invention has been completed on the basis of these findings.

Namely, the present invention relates to the following inventions:

1. A process for treating a dark opal basil, which comprises the steps of:
   (1) adding salt to dark opal basil leaves,
   (2) dehydrating the dark opal basil leaves obtained in step (1), and
   (3) immersing the dark opal basil leaves obtained in step (2) in an organic acid solution.

2. A process for producing dark opal basil leaves wherein its dye is kept in a high concentration, which comprises the steps of:
   (1) adding salt to dark opal basil leaves,
   (2) physically treating the dark opal basil leaves obtained in step (1) to such an extent that the cells thereof are not broken,
   (3) dehydrating the dark opal basil leaves obtained in step (2),
   (4) immersing the dark opal basil leaves dehydrated in step (3) in an organic acid solution, and
   (5) separating the dark opal basil leaves from the organic acid solution.

3. A process for producing a dark opal basil extract wherein its dye is kept in a high concentration, which comprises the steps of:
   (1) adding salt to dark opal basil leaves,
   (2) physically treating the dark opal basil leaves obtained in step (1) to such an extent that the cells thereof are broken,
   (3) dehydrating the dark opal basil leaves obtained in step (2),
   (4) immersing the dark opal basil leaves dehydrated in step (3) in an organic acid solution, and
   (5) separating the dark opal basil leaves from the organic acid solution.

DESCRIPTION OF THE EMBODIMENTS

The present invention will be described in detail below.

The dark opal basil used in the present invention (the scientific name: *Ocimum basilicum* L.) is an annual herb belonging to Labiatae and having a unique flavor.

The dark opal basils are not particularly limited so far as they are basils having a dark opal color. Preferred examples of them are dark opal basil, rubin basil, osmin basil and purple ruffles basil.

First of all, the dark opal basil leaves are treated with salt. By this treatment, the bulk of the dark opal basil leaves is reduced and, in addition, the subsequent dehydration is facilitated by the osmotic pressure.

The amount of salt to be added to the dark opal basil leaves is, for example, 1 to 15 parts by mass per 100 parts by mass of the leaves. When the physical treatment is to be conducted to an extent of not breaking the cells of the leaves, the amount of salt is, for example, 5 to 15 parts by mass. On the other hand, when the physical treatment is to be conducted to an extent of breaking the cells, the suitable amount of salt is 3 to 5 parts by mass.

The expression "an amount enough for breaking the cells" herein indicates an amount for breaking almost all the cells, for example, at least 60%, preferably at least 75%, of the cells in the leaves. On the other hand, the expression "an amount not breaking the cells" herein indicates an amount for keeping almost all the cells, for example, at least 50% of the cells, preferably at least 65%, of the cells in the leaves from the breakage. A specific method for determining the degree of the breakage of the cells will be described at a later stage.

For preventing the dye from the decomposition, it is preferred to keep the dark opal basil leaves under acidic conditions in the steps of the addition of salt and dehydration. The expression "acidic conditions" indicates, for example, about pH 2 to 6, preferably about pH 3 to 5. A small amount of an organic acid solution can be used for keeping the leaves acidic. As the organic acids, those used in the form of solutions thereof in the immersion step described below are suitably usable.

Preferred examples of the organic acids are acetic acid, malic acid and citric acid.

The organic acid solution is used in an amount required for making the leaves acidic. For example, about 10 to 15 parts by mass of the organic acid solution is enough per 100 parts by mass of the dark opal basil leaves.

Even when such an amount of the organic acid solution is added, the dark opal basil extract is not practically obtained.

Then, the dark opal basil leaves are thoroughly and homogeneously mixed with salt and then the obtained mixture is dehydrated. The time required for obtaining the homogeneous mixture is, for example about 10 seconds to 2 minutes, preferably about 30 seconds to 1 minute. The temperature in this step is an ordinary temperature such as about 10 to 30° C.

The mixing exerts some physical effect on the dark opal basil leaves. Therefore, when the cells in the dark opal basil leaves are not to be broken by the physical action, it is possible that the bottom of a given vessel is covered with the leaves, then salt is sprinkled or spread thereon, these steps are repeated several times to form layers and they are left in a sandwich form. On the other hand, when the cells in the dark opal basil leaves are to be broken, the thorough and homogeneous mixing step or the step of mixing the dark opal basil leaves with salt is not particularly required, and this step can be omitted.

The state of anthocyanin dye in the dark opal basil leaves thus treated with salt varies depending on the extent of the physical treatment, i.e. the physical treatment to an extent not to break the cells in the leaves or the physical treatment to an extent to break the cells.

Although it has not yet been logically proved, the following fact was observed: when the dark opal basil leaves treated with salt are physically treated to an extent not to break the cells in the leaves, anthocyanin dye is concentrated in the cells in the leaves by the dehydration and, as a result, the hydrophobicity thereof is increased. When these leaves are immersed in an acid solution which will be described below, anthocyanin dye is stabilized in the dark opal basil leaves by the acid (or in acidic state). Thus, dark opal basil leaves containing concentrated and stabilized anthocyanin dye can be obtained.

On the other hand, when the dark opal basil leaves treated with salt are physically treated to such an extent as to break the cells in the leaves, anthocyanin dye flows out of the cells and dehydrated. As a result, the dye is substantially uniformly concentrated in the whole leaves and the hydrophobicity thereof is increased. Then, the dehydrated dark opal basil leaves are immersed in an organic acid solution to stabilize anthocyanin dye by the organic acid. Further, anthocyanin dye is extracted from the broken cells into the organic acid solution. As a result, the concentration of anthocyanin dye in the leaves is lowered, and the extract having a high anthocyanin dye concentration is obtained.

Processes for the physical treatment of the leaves to an extent not to break the cells include, for example, a process wherein a laminate of the layers of the dark opal basil leaves and salt is formed in the vessel in a sandwich form so that the weight of the laminate can be utilized, and a process wherein a weight is put on the laminate. In another process, the sandwich-like laminate is pressed with a compressor while the degree of the breakage of the cells is observed. Further, the cells can be broken by crumpling or kneading with human hands.

The physical treatment time is variable so far as the cells are not broken. The suitable physical treatment time is, for example, about 30 minutes to 4 hours, particularly about 1 to 3 hours.

When the degree of the physical treatment is increased while the cells are protected from the breakage, the dehydration is improved in the subsequent step and, as a result, the leaves having a high anthocyanin dye concentration can be obtained.

On the other hand, means for applying a high physical power for breaking the cells are, for example, a mixer, a kneader and crumpling machine. As a matter of course, the leaves can be powerfully crumpled with hands.

The degree of the breakage of the cells can be determined by, for example, observing the surface (back surface) of the leaf with an optical microscope, counting the number of the guard cells (lip-shaped cells for forming stomas) per a given area and calculating the rate of the broken cells. Concretely, a dark opal basil leaf to be used as a sample is placed on a Petri dish, the leaf is spread, a piece (about 5 mm×5 mm) thereof is cut with a cutter such as a surgical knife, the piece is placed on a slide with the leaf surface upside, one or two drops of water are dripped thereon, a covering glass is placed thereon, the guard cells are observed with the microscope (magnification: about 100 to 200), the number of the guard cells in a given area is counted and the ratio of the broken cells is calculated.

Also by the strong crumpling or kneading with hands, the cells can be physically broken. In such a case, whether the cells have been broken or not can be confirmed by the above-described method.

The time necessary for such a physical process is, for example, about 1 to 10 minutes, preferably 3 to 5 minutes.

After the treatment with salt followed by the physical treatment, the dark opal basil leaves are dehydrated with, for example, a drum-type compressor. The suitable degree of the dehydration is such that 5 to 25 parts by mass, particularly 15 to 25 parts by mass, of water is removed per 100 parts by mass of the dark opal basil leaves.

The dehydration is usually conducted at around ambient temperature. The dehydration time for attaining the above-described degree of dehydration varies depending on the variety of the dehydration device.

When the physical treatment is conducted to an extent of not breaking the cells, the dehydration treatment is conducted with the weight of the leaves themselves. In such a case, the dehydration time is the time of the physical treatment conducted to an extent of not breaking the cells. On the other hand, when the drum-type compressor is used, the dehydration time is about 5 to 30 seconds, preferably about 15 to 30 seconds.

The volume of the dark opal basil leaves can be reduced by, for example, 95 to 99% and usually 97 to 98% by the dehydration. Namely, the volume can be reduced to 1 to 5%, particularly 2 to 3%. The bulkiness of the dark opal basil leaves is thus remarkably reduced.

The dehydrated dark opal basil leaves are then immersed in a solution of the above-described organic acid. The acidity of the organic acid is, for example, about 4.3 to 8.0%, preferably about 5.0 to 7.5%.

The pH of the organic acid solution is usually about 2 to 4, preferably about 2 to 3.

The organic acid solution is used in an amount of, for example, 20 to 60 parts by mass, particularly 30 to 50 parts by mass, per 100 parts by mass of the dehydrated dark opal basil.

The treatment temperature is usually around room temperature. Taking the problems such as the spoiling into consideration, the suitable treatment temperature is about 4 to 10° C.

The treatment time is usually at least one week and preferably at least one month.

Anthocyanin dye can be kept in a high concentration in the dark opal basil leaves or it can be concentrated in the acid solution by controlling the degree of the physical treatment of the leaves conducted after the treatment with salt. Further, anthocyanin dye can be concentrated equally in the leaves and in the acid solution by controlling the extent of the physical treatment.

When anthocyanin dye is concentrated in the dark opal basil leaves, the period of the immersion is not particularly limited and it can be until the leaves is used as a dry herb or dry spice. On the other hand, when this dye is concentrated in the acid solution, the degree of the concentration varies depending on the immersion time and, in this case, the longer the immersion time, the higher the concentration. Anthocyanin dye kept in the acid solution can be preserved without fading in color for a long period of time.

The storage temperature is usually not higher than room temperature, preferably about 4 to 10° C.

When the immersed dark opal basil leaves are used as a dry herb or dry spice, the leaves are taken out of the acid solution and then dried. The drying methods are, for example, sun-drying method, hot air-drying method, freeze-drying method, cold air-drying method and low-temperature vacuum-drying method. The leaves can be cut into pieces having a given size or they can be pulverized to a given particle size.

After the immersion, a suitable amount of the leaves to be used is taken out of the organic acid solution, the solution is drained off and the leaves are used as they are.

The dark opal basil leaves and acid extract thereof of the present invention are usable for cooking various dishes such as pastas, marinades, salads, meat dishes, fish dishes, deserts, breads and sausages.

EXAMPLES

The following Examples and Comparative Examples will further illustrate the present invention, which by no means limit the scope of the invention.

Example 1

An Example wherein the Physical Power was Enough for Breaking the Cells

Fresh dark opal basil leaves were subjected to a foreign matter-separating treatment to remove hard, thick stems, flower and unripe seeds, worms and other plants. The leaves were then washed with water to remove mud and dusts therefrom. After draining water, 60 g (3%) of salt and 300 g (15%) of wine vinegar (acidity: 7%, pH: 2.85) were added to 2 kg of the leaves.

Then, the dark opal basil leaves were crumpled or kneaded together with salt by hands with such a power as to break 75% of the cells in the leaves under the acidic condition for 5 minutes. In the course of the crumpling or kneading, water flew out and then water was squeezed from the leaves by hands to dehydrate them. The volume of the leaves thus obtained was as small as only 2% based on the starting material.

Then, 50% by mass (1 kg), based on the starting dark opal basil leaves, of the wine vinegar (acidity: 7%, pH: 2.85) was added to the dehydrated leaves, and they were kept at 10° C. for one month while the leaves were immersed in the wine vinegar. For stabilizing pH, 1% (20 g), based on the leaves, of citric acid was added to the acid solution.

The extract thus obtained had deep, vivid dark opal color, well-balanced wine vinegar taste and dark opal basil flavor, and a mild flavor. The extract had a tone of the color far superior to that of an extract obtained in Comparative Example 1 given below, and a flavor superior to that of the latter.]

Example 2

An Example wherein the Physical Power was Lower than that for Breaking the Cells Fresh dark opal basil leaves were subjected to a foreign matter-separating treatment to remove hard, thick stems, flower and unripe seeds, worms and other plants. The leaves were then washed with water to remove mud and dusts therefrom. After draining water, 60 g (3%) of salt and 300 g (15%) of wine vinegar (acidity: 7%, pH: 2.85) were added to 2 kg of the leaves. The leaves, salt and the wine vinegar were thoroughly mixed with hands for about 30 seconds.

Then, a weight weighing 10 to 15 kg was placed on the leaves at ambient temperature (for example, 10 to 30° C.) and they were left in such a state for 1 hour. While they were left under these conditions, water slowly flew out of the leaves. By squeezing water from the leaves by hands, the dehydration was completed. In the course of the process, the leaves were sampled and examined with the microscope to confirm that not more than 60% of the guard cells of the leaves were broken.

The volume of the leaves thus obtained was as small as only 3% based on the leaves used as the starting material.

Then, 50% by mass (1 kg), based on the starting dark opal basil leaves, of the wine vinegar (acidity: 7%, pH: 2.85) was added to the dehydrated leaves, and they were kept at 10° C. for one month while the leaves were immersed in the wine vinegar. For stabilizing pH, 1% (20 g), based on the leaves, of citric acid was added to the acid solution.

The leaves thus obtained had deep, vivid dark opal color, well-balanced wine vinegar taste and dark opal basil flavor, and a mild flavor. The leaves had a tone of the color far superior to that of the leaves taken out after the immersion in Comparative Example 1 given below, and a flavor superior to that of the latter.

Comparative Example 1

Fresh dark opal basil leaves were subjected to a foreign matter-separating treatment to remove hard, thick stems, flower and unripe seeds, worms and other plants. The leaves were then washed with water to remove mud and dusts therefrom. The leaves were not physically treated or dehydrated. After draining water, 200 g of the leaves were immersed in 10 times as much as (2 kg) wine vinegar and kept in a cold, dark place (10° C.) for one week so as not to spoil the leaves. Then, the leaves were taken out.

The extract thus obtained was light pink and lacking in mildness and had a strong sour taste, though it had the dark opal basil flavor. The leaves taken out after the immersion were light reddish brown, and the tone of the color and the flavor thereof were inferior to those obtained in the Examples.

For reference, the quantities of the dye in the dark opal basil leaves and in the extracts thereof obtained in Examples 1 and 2 and Comparative Example 1 were compared with each other. The quantity of the dye was determined as described below.

The obtained dark opal basil leaves were thoroughly dehydrated and then freeze-pulverized. 0.5 g of the obtained powder was taken. 5 ml of 1% HCl-MeOH was added to the powder. After the ultrasonic extraction for 10 minutes followed by the light centrifugation, the obtained supernatant liquid was diluted to a concentration of 1/10 with 1% HCl-MeOH. The absorbance at around 530 nm was determined with a spectrophotometer. The extract was diluted to a concentration of 1/20 with 1% HCl-MeOH, and the absorbance at around 530 nm was determined with a spectrophotometer.

TABLE 1

|  | Dark opal basil leaves | Extract |
| --- | --- | --- |
| Example 1 | 1.396 | 0.658 |
| Example 2 | 1.569 | 0.569 |
| Comparative Example 1 | 0.311 | 0.163 |

Comparative Example 2

In this comparative example, the harvested dark opal basil leaves were used as they were. In this Example, no extract was obtained. The acid or the flavor of vinegar was not added.

Comparative Example 3

In this comparative example, the harvested dark opal basil leaves were directly dried by solar heat in the shade. In this Example, no extract was obtained. The acid or the flavor of vinegar was not added. The tone of the color of the dark opal basil leaves was mostly changed into brown in the course of the drying.

Application Example 1

French Dressing

| Composition | |
| --- | --- |
| White wine vinegar | 50 g |
| Basil extract obtained in Example 1 | 25 g |
| Salad oil | 75 g |
| Salt | 2 g |
| Mustard | 2 g |
| Pepper | a small amount |
| Basil leaves obtained in Example 2 | 3 g |

The starting materials other than the salad oil were mixed together. The salad oil was added in small portions to the obtained mixture while they were stirred to obtain French dressing.

The obtained dressing was vivid dark opal and had a moderate basil flavor because of the basil leaves and extract contained therein. On the other hand, when the basil leaves and extract obtained in Comparative Example 1 were used, the dressing had only a low tone of the color, the sour taste of the vinegar was strong, and it was lacking in the mildness.

Application Example 2

Mayonnaise Sauce

| Composition | |
| --- | --- |
| Mayonnaise | 59 g |
| Basil extract obtained in Example 1 | 7 g |
| Basil leaves obtained in Example 2 | 7 g |

The basil extract obtained in Example 1 was added to the mayonnaise and they were thoroughly stirred. Then, the basil leaves obtained in Example 2 were added to the obtained mixture to obtain a mayonnaise sauce.

The obtained mayonnaise sauce was vivid dark opal and had a moderate basil flavor because of the basil leaves and extract contained therein. On the other hand, when the basil leaves and extract obtained in Comparative Example 1 were used, the dressing had only a low tone of the color, the sour taste of the vinegar was strong and it was lacking in the mildness.

Application Example 3

Basil Scone

| Composition | |
| --- | --- |
| Weak flour | 250 g |
| Baking powder | 3 g |
| Salt-free butter | 70 g |
| Sugar | 50 g |
| Egg | one |
| Milk | 35 g |
| Basil leaves obtained in Example 2 and dried | 3 g |

The weak flour and the baking powder were mixed together. The butter was added to the obtained mixture, and they were lightly mixed together by fingers until the mixture had become flaky. Then, sugar was added thereto. The egg and milk were added to the obtained mixture under stirring. Finally, the basil leaves obtained in Example 2 were added to the mixture. The dough thus obtained was cut into pieces with a pattern for the scorns, and the pieces were baked in an oven at 180° C. for 20 minutes.

After the baking had finished, the basil leaves still kept the dark opal color tone, and the scorns kept the delicious basil flavor. On the other hand, when the basil leaves and extract obtained in Comparative Example 2 or 3 were used, the dark opal color tone peculiar to the dark opal basil could not be kept, and the color was changed into brown.

Application Example 4

Basil Cake

| Composition | |
|---|---|
| Weak flour | 260 g |
| Hot water | 130 g |
| Egg | ½ |
| Olive oil | suitable amount |
| Bacon | 20 g |
| Powdered cheese | 10 g |
| Basil leaves obtained in Example 2 and dried | 5 g |

The weak flour was sieved and kneaded while hot water (60° C.) was added in small portions to the flour. When the mix became as soft as an earlobe, the egg was added thereto to obtain a dough. The dough was wrapped and kept in a refrigerator at 4° C. for one hour. Then, the dough was divided into 4 equal parts. Each part was spread to a square of 20 cm×20 cm. The olive oil was applied to the dough. Then, the bacon chopped into fine pieces, the powdered cheese and the basil leaves obtained in Example 2 were sprinkled thereon. The dough was rolled and formed into a whirling pattern. The pieces were spread with a rolling pin. The olive oil was put into a frying pan. After heating the pan, both surfaces of the shaped dough were baked to a perfect brown.

After the baking of the basil cake had finished, the basil leaves still kept the dark opal color tone, and the cakes kept the delicious basil flavor. On the other hand, when the basil leaves and extract obtained in Comparative Example 2 or 3 were used, the dark opal color tone peculiar to the dark opal basil could not be kept, and the color was changed into brown.

Application Example 5

Basil Madeleine

Granulated sugar was added to stirred eggs, and the obtained mixture was beaten with an egg beater to obtain a thick mixture (part 1). Separately, a mixture of weak flour and baking powder was sieved (part 2). Butter was molten (part 3). The sieved powder (part 2) was added to part 1, and they were lightly mixed together. Then part 3 was added to the obtained mixture, and they were homogeneously mixed. Finally, basil leaves were added to the mixture, and they were lightly mixed. The mixture was poured into molds and baked in an oven at 180° C. for 20 minutes.

| Base dough | |
|---|---|
| Weak flour | 80 g |
| Baking powder | 1 g |
| Egg | 3 |
| Granulated sugar | 60 g |
| Butter | 65 g |
| Basil leaves obtained in Example 2 | 5 g |
| (for 100 g of the base dough) | |
| (or basil leaves obtained in Example 2 and dried | 2.5 g) |

After the baking of the Madeleine had been finished, the basil leaves still kept the dark opal color tone, and the cakes kept the delicious basil flavor. On the other hand, when the basil leaves obtained in Comparative Example 2 or 3 were used, the dark opal color tone peculiar to the dark opal basil could not be kept, and the color was changed into brown.

Application Example 6

Basil Mousse

Pieces of Western pears in a can were separated from the syrup. The pieces of Western pears were processed in a mixer to obtain a paste. The syrup, lemon juice and the basil extract were added to the paste, and they were mixed. The amount of each of the materials is shown below. Thus, part 1 was obtained.

On the other hand, water was added to granulated sugar, and the mixture was heated to obtain a viscous syrup (part 2). A small amount of granulated sugar was added to egg white, and they were beaten together. The obtained mixture was further beaten while part 2 was added in portions thereto.

Separately, fresh cream was beaten until it became viscous to obtain part 3.

Gelatin was kept steeped in water and then dissolved in a predetermined amount of hot water to form part 4.

Part 4 was added to part 1 to lower the temperature. Parts 3 and 4 were added to the obtained mixture. Finally basil leaves were added thereto, and they were mixed and cooled in a refrigerator.

| Composition | |
|---|---|
| Canned Western pears | 260 g |
| Canned Western pear syrup | 40 g |
| Lemon juice | 10 g |
| Basil extract obtained in Example 1 | 60 g |
| Egg white | 2 |
| Fresh cream | 150 g |
| Granulated sugar | 125 g |
| Water (for syrup) | 65 g |
| Powdered gelatin | 5 g |
| Hot water (for jelly) | 50 g |
| Basil leaves obtained in Example 2 | 5 g |

With the basil leaves and the extract, the obtained basil mousse had vivid dark opal color and kept the delicious basil flavor. On the other hand, when the basil leaves obtained in Comparative Example 1 were used, the dark opal color tone of the mousse was weak, the sour taste of the vinegar was strong and it was lacking in the mildness.

Application Example 7

Basil Dip

Cream cheese was softened by kneading and then the following materials were mixed with the kneaded cream cheese.

| Composition | |
|---|---|
| Cream cheese | 80 g |
| Basil extract obtained in Example 1 | 16 g |
| Lemon juice | 4 g |
| Salt | 0.5 g |
| Basil leaves obtained in Example 2 | 1.5 g |

With the basil leaves and the extract, the obtained basil dip had vivid dark opal color and kept the delicious basil flavor. On the other hand, when the basil leaves obtained in Comparative Example 1 were used, the dark opal color tone of the dip was weak, the sour taste of the vinegar was strong and it was lacking in the mildness.

Application Example 8

Basil Salt

The basil leaves obtained in Example 2 were pulverized with a mixer or crushed in a mortar. Then, salt was added to the obtained powder in an amount shown below.

| Composition | |
|---|---|
| Basil leaves obtained in Example 2 and dried | 3 g |
| Salt | 30 g |

The basil salt thus obtained was usable as a seasoning for fried foods.

The obtained basil salt was vivid dark opal. When the basil salt was used as a seasoning for fried foods or the like, the basil flavor and the moderate sour taste fit the foods. When the basil leaves obtained in Example 3 were used, the tone of the color was inferior.

Application Example 9

Basil Marinade Dressing

The following materials were mixed together. Fried meats and fish were marinated in the dressing or this dressing was used for salads.

| Composition | |
|---|---|
| Basil extract obtained in Example 1 | 50 g |
| Sugar | 10 g |
| Salt | 5 g |
| Honey | 5 g |
| Lemon juice | 5.5 g |
| Pepper | 0.2 g |
| Basil leaves obtained in Example 2 | 5 g |

With the basil leaves and the extract, the obtained basil marinade dressing had vivid dark opal color and kept the delicious basil flavor. On the other hand, when the basil leaves obtained in Comparative Example 1 were used, the dark opal color tone of the dip was weak, the sour taste of the vinegar was strong and it was lacking in the mildness.

Application Example 10

Basil Drink

The following materials were mixed together. The obtained mix was diluted with carbonated water to a desired concentration to obtain a drink.

| Composition | |
|---|---|
| Basil extract obtained in Example 1 | 60 g |
| Sugar | 5 g |
| Carbonated water | suitable amount |
| Honey | 6 g |
| Lemon juice | 1.8 g |

With the extract, the obtained basil drink had vivid dark opal color and kept the delicious basil flavor. On the other hand, when the basil leaves obtained in Comparative Example 1 were used, the dark opal color tone of the drink was weak, the sour taste of the vinegar was strong and it was lacking in the mildness.

The present invention provides dark opal basil leaves or acid extract thereof containing concentrated anthocyanin dye and storable for a long period of time.

What is claimed is:

1. A process for producing an extract of basil leaves (*Ocimum basilicum*), comprising:
   (1) adding salt to basil leaves from a basil selected from the group consisting of Dark Opal Basil, Rubin Basil, Osmin Basil and Purple Ruffles Basil to obtain salt-treated basil leaves, so that the salt-treated basil leaves are maintained under acidic conditions at a pH of 2 to 6, wherein the basil leaves comprise cells and dye;
   (2) physically treating the basil leaves obtained from (1) to such an extent that cells of the basil leaves are broken;
   (3) dehydrating the basil leaves obtained in (2) by squeezing them, wherein the basil leaves are maintained at a pH of 2 to 6;
   (4) immersing the basil leaves obtained in step (3) in an organic acid solution; and
   (5) separating said basil leaves from the organic acid solution to produce an extract of the basil leaves, wherein the extract contains the dye.

2. The process according to claim 1, wherein in (2), the basil leaves are physically treated so that 60% or more of the cells of the basil leaves are broken.

3. The process according to claim 1, wherein in (2), the basil leaves are physically treated so that 75% or more of the cells of the basil leaves are broken.

4. The process according to claim 1, wherein in (3), the basil leaves are maintained at a pH of 3 to 5.

5. The process according to claim 1, wherein the organic acid in said organic acid solution is selected from the group consisting of acetic acid, malic acid and citric acid.

6. The process according to claim 1, wherein the organic acid in said organic acid solution comprises acetic acid.

7. The process according to claim 1, wherein the organic acid in said organic acid solution comprises malic acid.

8. The process according to claim 1, wherein the organic acid in said organic acid solution comprises citric acid.

9. The process according to claim 1, wherein said salt is used in an amount of 1 to 15 parts by mass per 100 parts by mass of said leaves.

10. The process according to claim 1, wherein the organic acid solution has a pH of 2 to 4.

11. The process according to claim 1, wherein the organic acid solution has a pH of 2to 3.

* * * * *